US012192587B2

(12) United States Patent
Thaker et al.

(10) Patent No.: US 12,192,587 B2
(45) Date of Patent: Jan. 7, 2025

(54) TECHNIQUES FOR CURATING CONTENT ITEMS

(71) Applicant: DISNEY ENTERPRISES, INC., Burbank, CA (US)

(72) Inventors: Madhav Thaker, Los Angeles, CA (US); Warren Michael Bruttell, Temecula, CA (US); Michael Halleen, Ojai, CA (US); Joshua David Schaffer, Los Angeles, CA (US); Meghan Melanie Toomayan, Los Angeles, CA (US)

(73) Assignee: Disney Enterprises, Inc., Burbank, CA (US)

( * ) Notice: Subject to any disclaimer, the term of this patent is extended or adjusted under 35 U.S.C. 154(b) by 0 days.

(21) Appl. No.: 17/525,574

(22) Filed: Nov. 12, 2021

(65) Prior Publication Data

US 2023/0156289 A1 May 18, 2023

(51) Int. Cl.
*H04N 21/442* (2011.01)
*H04N 21/45* (2011.01)
*H04N 21/482* (2011.01)

(52) U.S. Cl.
CPC ... *H04N 21/4826* (2013.01); *H04N 21/44222* (2013.01); *H04N 21/4532* (2013.01)

(58) Field of Classification Search
None
See application file for complete search history.

(56) References Cited

U.S. PATENT DOCUMENTS

| | | | |
|---|---|---|---|
| 2013/0080907 A1* | 3/2013 | Skelton | H04N 21/4755 715/738 |
| 2014/0068692 A1* | 3/2014 | Archibong | H04N 21/6334 725/116 |
| 2016/0080815 A1* | 3/2016 | Ruffini | H04N 21/41407 725/46 |
| 2017/0103343 A1* | 4/2017 | Yee | G06N 7/01 |
| 2020/0112769 A1* | 4/2020 | Potluru | H04N 21/4668 |
| 2021/0035159 A1* | 2/2021 | Zhou | G06Q 30/0645 |

* cited by examiner

*Primary Examiner* — Jefferey F Harold
*Assistant Examiner* — Charles N Hicks
(74) *Attorney, Agent, or Firm* — Squire Patton Boggs LLP; Sarah Mirza

(57) ABSTRACT

Techniques are disclosed for curating content items. In some embodiments, a content item group generator applies rules defining inclusion and exclusion criteria to content items and associated metadata in order to assign the content items to content item groups. Given the assignments of content items to content item groups, a list generator applies a machine learning technique to generate, for each content item, a representation of the content item that includes weights associating the content item with the content item groups. The list generator then computes a weighted sum of representations of content items that a user has purchased and/or otherwise engaged with in order to generate a representation of the user that includes weights indicating affinities of the user with the content item groups. The list generator further generates one or more lists for display to the user based on the representation of the user.

20 Claims, 8 Drawing Sheets

|  | Category $320_1$ | | | ... | Category $320_2$ | | | ... | Category $320_N$ | | | Months Behind | Weight |
|---|---|---|---|---|---|---|---|---|---|---|---|---|---|
| Content Item Vector 302 | 0 | 0.1 | 0.3 | ... | 0 | 0.1 | 0.3 | ... | 0 | 0 | 0 | 0 | 1 |
| Content Item Vector 304 | 0 | 0 | 0.8 | ... | 0 | 0 | 0.8 | ... | 1 | 0 | 0 | 0 | 1 |
| Content Item Vector 306 | 0.9 | 0 | 0.7 | ... | 0.9 | 0 | 0.7 | ... | 1 | 0 | 0 | 2 | 0.75 |
| Content Item Vector 308 | 0.6 | 0 | 0.2 | ... | 0.6 | 0 | 0.2 | ... | 0 | 1 | 0 | 5 | 0.5 |
| Content Item Vector 310 | 0.5 | 0.6 | 0.4 | ... | 0.5 | 0.6 | 0.4 | ... | 0 | 1 | 0 | 8 | 0.3 |
| Content Item Vector 312 | 0 | 0 | 0.9 | ... | 0 | 0 | 0.9 | ... | 0 | 1 | 0 | 8 | 0.3 |
| Content Item Vector 314 | 0.2 | 0.1 | 0 | ... | 0.2 | 0.1 | 0 | ... | 0 | 1 | 0 | 9 | 0.27 |
| Content Item Vector 316 | 0 | 0 | 0.1 | ... | 0 | 0 | 0.1 | ... | 0 | 1 | 0 | 11 | 0.27 |
| User Vector 318 | 1.18 | 0.31 | 0.42 | 1.7 | 1.18 | .31 | 0.42 | 1.7 | 1.75 | 0.57 | 0.42 | 0 | |

FIG. 3

TECHNIQUES FOR CURATING CONTENT ITEMS

BACKGROUND

Technical Field

Embodiments of the present disclosure relate generally to computer processing of content items and, more specifically, to techniques for curating content items.

Description of the Related Art

As digital and mobile communications have become ubiquitous, there are increasingly many options for end users to enjoy media content in addition to the traditional options of watching broadcast television (TV) and watching movies in-theater. For example, end users can now stream free and subscription content to televisions or mobile devices, rent DVDs, purchase pay-per-view rights to specific digital content, and so on.

Currently, there are few techniques for organizing media content for consumption by end users. One conventional approach for organizing media content is to associate media content items with metadata that indicates generic categories to which the media content items belong. For example, a collection of movie titles could be associated with metadata indicating genres, such as "comedy," "romance," "science fiction," etc. to which those movies titles belong. Lists of movie titles from the different genres can then be presented for consumption by an end user.

One drawback of the above approach is that multiple lists can include many of same media content items, because the metadata oftentimes indicates that each media content item belongs to more than one generic category. For example, the metadata could indicate multiple genres to which a particular movie title belongs (e.g., comedy and romance), and that movie title would then appear in multiple lists for those genres. Another drawback of the above approach is that little, if any, processing is performed on the metadata. As a result, lists that are generated using such metadata do not convey enough, if any, meaningful information to assist end-users in content selection, other than generic categories to which media content items belong.

As the foregoing illustrates, what is needed in the art are more effective techniques for curating content items, including media content items.

SUMMARY

One embodiment of the present application sets forth a computer-implemented method for curating content items. The method includes generating, for each content item included in a plurality of content items, a representation of the content item, wherein the representation of the content item comprises a plurality of weights associating the content item with a plurality of content item groups. The method further includes generating a representation of the user based on one or more of the representations of content items, wherein the representation of the user comprises a plurality of weights associating the user with the plurality of content item groups, and wherein the one or more of the representations of content items are associated with content items that the user has at least one of purchased or engaged with. In addition, the method includes generating one or more lists of content items based on the representation of the user, and causing the one or more lists of content items to be displayed to the user.

Other embodiments of the present disclosure include, without limitation, one or more computer-readable media including instructions for performing one or more aspects of the disclosed techniques as well as a computing device for performing one or more aspects of the disclosed techniques.

At least one technical advantage of the disclosed techniques relative to the prior art is that the disclosed techniques generate lists of content items in which the same content item does not appear more than a threshold number of times within multiple lists that are presented to a user. In addition, the disclosed techniques can generate lists of content items that convey more meaningful information that is personalized to the user. These technical advantages represent one or more technological improvements over prior art approaches.

BRIEF DESCRIPTION OF THE DRAWINGS

So that the manner in which the above recited features of the disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

FIG. 3 illustrates generating an exemplar user vector, according to various embodiments.

DETAILED DESCRIPTION

In the following description, numerous specific details are set forth to provide a more thorough understanding of the present invention. However, it will be apparent to one of skill in the art that embodiments of the present invention may be practiced without one or more of these specific details.

System Overview

Figure 1:
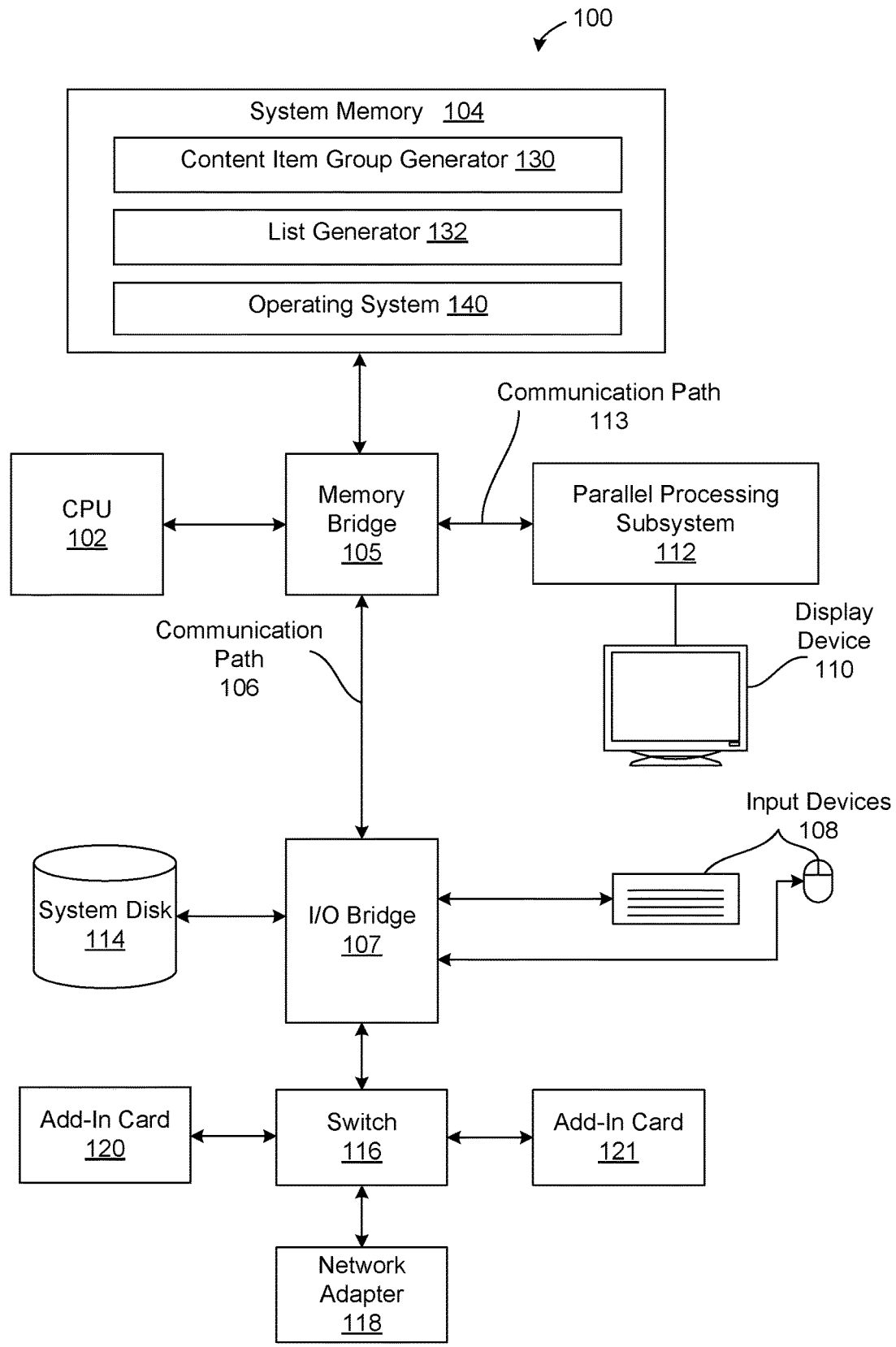
FIG. 1 illustrates a system configured to implement one or more aspects of the various embodiments.

FIG. 1 illustrates a system 100 configured to implement one or more aspects of the various embodiments. As shown, the system 100 includes, without limitation, a central processing unit (CPU) 102 and a system memory 104 coupled to a parallel processing subsystem 112 via a memory bridge 105 and a communication path 113. The memory bridge 105 is further coupled to an I/O (input/output) bridge 107 via a communication path 106, and the I/O bridge 107 is, in turn, coupled to a switch 116.

In operation, the I/O bridge 107 is configured to receive user input information from one or more input devices 108, such as a keyboard, a mouse, a joystick, etc., and forward the input information to the CPU 102 for processing via the communication path 106 and the memory bridge 105. The switch 116 is configured to provide connections between the I/O bridge 107 and other components of the system 100, such as a network adapter 118 and various add-in cards 120 and 121. Although two add-in cards 120 and 121 are illustrated, in some embodiments, the system 100 may only include a single add-in card.

As also shown, the I/O bridge 107 is coupled to a system disk 114 that may be configured to store content, applications, and data for use by CPU 102 and parallel processing subsystem 112. As a general matter, the system disk 114 provides non-volatile storage for applications and data and may include fixed or removable hard disk drives, flash memory devices, and CD-ROM (compact disc read-only-memory), DVD-ROM (digital versatile disc-ROM), Blu-ray, HD-DVD (high definition DVD), or other magnetic, optical, or solid state storage devices. Finally, although not explicitly shown, other components, such as universal serial bus or other port connections, compact disc drives, digital versatile disc drives, movie recording devices, and the like, may be connected to the I/O bridge 107 as well.

In various embodiments, the memory bridge 105 may be a Northbridge chip, and the I/O bridge 107 may be a Southbridge chip. In addition, communication paths 106 and 113, as well as other communication paths within the system 100, may be implemented using any technically suitable protocols, including, without limitation, AGP (Accelerated Graphics Port), HyperTransport, or any other bus or point-to-point communication protocol known in the art.

In some embodiments, the parallel processing subsystem 112 comprises a graphics subsystem that delivers pixels to a display device 110 that may be any conventional cathode ray tube, liquid crystal display, light-emitting diode display, or the like. In such embodiments, the parallel processing subsystem 112 incorporates circuitry optimized for graphics and video processing, including, for example, video output circuitry. Such circuitry may be incorporated across one or more parallel processing units (PPUs) included within the parallel processing subsystem 112. In other embodiments, the parallel processing subsystem 112 incorporates circuitry optimized for general purpose and/or compute processing. Again, such circuitry may be incorporated across one or more PPUs included within the parallel processing subsystem 112 that are configured to perform such general purpose and/or compute operations. In yet other embodiments, the one or more PPUs included within the parallel processing subsystem 112 may be configured to perform graphics processing, general purpose processing, and compute processing operations. The system memory 104 may include at least one device driver configured to manage the processing operations of the one or more PPUs within the parallel processing subsystem 112.

In various embodiments, the parallel processing subsystem 112 may be or include a graphics processing unit (GPU). In some embodiments, the parallel processing subsystem 112 may be integrated with one or more of the other elements of FIG. 1 to form a single system. For example, the parallel processing subsystem 112 may be integrated with the CPU 102 and other connection circuitry on a single chip to form a system on chip (SoC).

It will be appreciated that the system shown herein is illustrative and that variations and modifications are possible. The connection topology, including the number and arrangement of bridges, the number of CPUs, and the number of parallel processing subsystems, may be modified as desired. For example, in some embodiments, the system memory 104 could be connected to the CPU 102 directly rather than through the memory bridge 105, and other devices would communicate with the system memory 104 via the memory bridge 105 and the CPU 102. In other alternative topologies, the parallel processing subsystem 112 may be connected to the I/O bridge 107 or directly to the CPU 102, rather than to the memory bridge 105. In still other embodiments, the I/O bridge 107 and the memory bridge 105 may be integrated into a single chip instead of existing as one or more discrete devices. In some embodiments, any combination of the CPU 102, the parallel processing subsystem 112, and the system memory 104 may be replaced with any type of virtual computing system, distributed computing system, or cloud computing environment, such as a public cloud, a private cloud, or a hybrid cloud. Lastly, in certain embodiments, one or more components shown in FIG. 1 may not be present. For example, the switch 116 could be eliminated, and the network adapter 118 and add-in cards 120, 121 would connect directly to the I/O bridge 107.

Illustratively, the system memory 104 stores a content item group generator 130, a list generator 132, and an operating system 140 on which the content item group generator 130 and the list generator 132 run. The operating system 140 may be, e.g., Linux®, Microsoft Windows®, or macOS®. In some embodiments, the content item group generator 130 is an application that assigns content items to content item groups based on the rules indicating inclusion and exclusion criteria for the content item groups, as discussed in greater detail below in conjunction with FIG. 2. In some embodiments, the list generator 132 is an application that generates and causes to be displayed lists of content items based on user purchases and/or other user engagement behavior, as discussed in greater detail below in conjunction with FIGS. 2-8. Although the content item group generator 130 and the list generator 132 are shown as distinct applications for illustrative purposes, in other embodiments, functionality of the content item group generator 130 and the list generator 132 may be combined into a single application or divided among more than two applications and/or other software, which can run on any number of computing systems.

Automated Curation of Content Items

Figure 2:
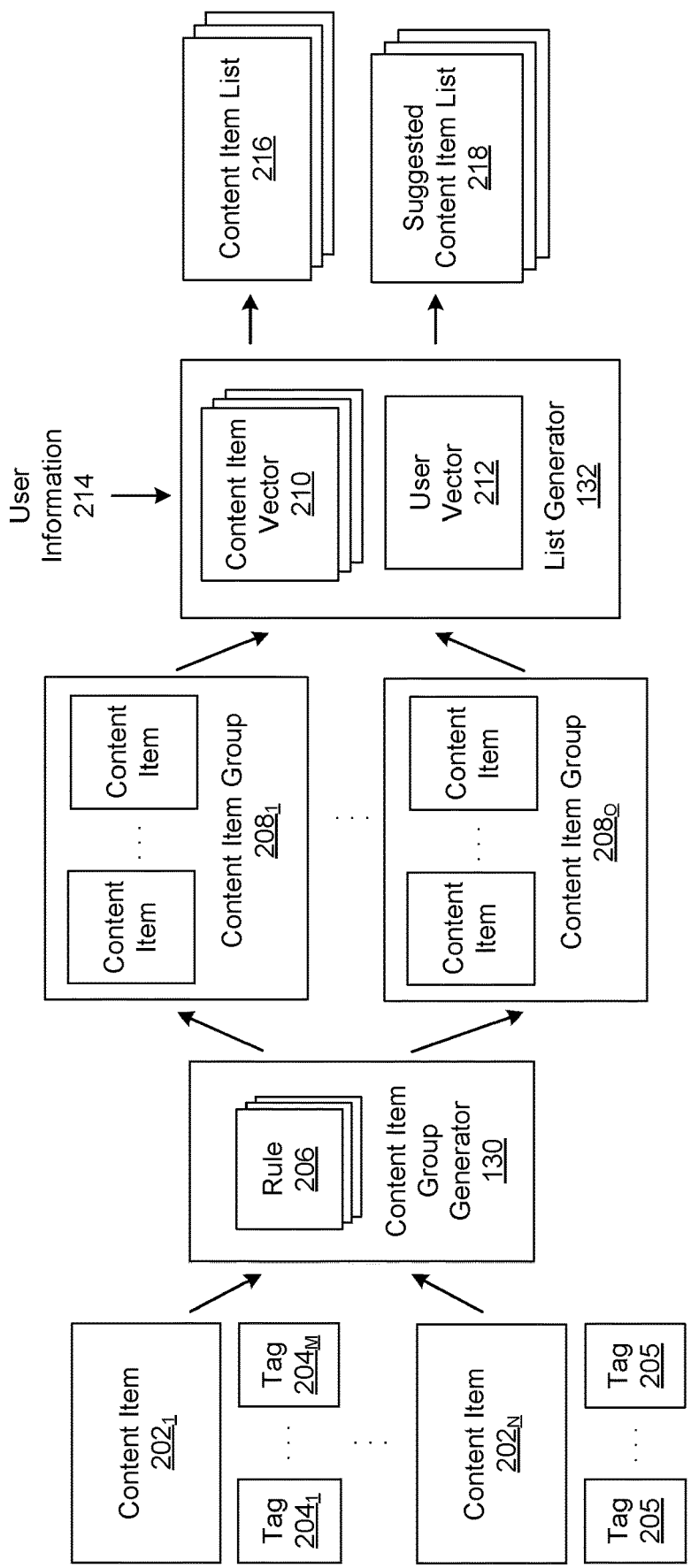
FIG. 2 illustrates in greater detail the content item group generator and the list generator of FIG. 1, according to various embodiments.

FIG. 2 illustrates in greater detail the content item group generator 130 and the list generator 132 of FIG. 1, according to various embodiments. As shown, the content item group generator 130 applies a set of rules 206 to assign content items $202_{1-N}$ (referred to herein collectively as content items 202 and individually as a content item 202) to content item groups $208_{1-O}$ (referred to herein collectively as content item groups 208 and individually as a content item group 208). The content items 202 can include any technically feasible type(s) of content, such as media content items (e.g., movies, episodic shows, animated shorts, music titles, etc.), product descriptions, etc. that can be presented to a user.

As shown, content item $202_1$ is associated with a number of metadata tags $204_{1-M}$ (referred to herein collectively as metadata tags 204 and individually as a metadata tag 204).

The metadata tags 204 can indicate any suitable attributes associated with the content item $202_1$. For example, metadata tags associated with a movie title could indicate various attributes of the movie, such as one or more genres to which the movie belongs, actors or characters appearing in the movie, types of characters appearing in the movie, a director who directed the movie, a composer of music in the movie, a storyline within the movie, a tone of the movie, a franchise to which the movie belongs, and the like. The metadata tags 204 can be created in any technically feasible manner, such as based on user input by content producers and/or distributors. Other content items 202 (e.g., content item $202_N$) are each associated with metadata tags (e.g., metadata tags 205) as well.

The rules 206 define inclusion and exclusion criteria for assigning content items (e.g., the content items 202) to content item groups 208. Each of the content item groups 208 includes a set of content items 202 that can be presented together to users. Returning to the movie titles example, a movie title group could relate to a particular genre, sub-genre, franchise, storyline, persona (e.g., actor, character, director, composer, etc.), theme, event, and/or a combination thereof. In some embodiments, the inclusion and exclusion criteria of each rule 206 are specified using conditions that are joined with AND, OR, and/or NOT operators. Further, the rules 206 can be based on various taxonomies and structures for assigning content items to content item groups 208. Returning to the movie titles example, one of the content item groups 208 could be a "psychological thriller" group of movie titles. In such a case, a rule 206 that is used to assign movie titles to the "psychological thriller" title group could require the movie titles to meet certain inclusion and exclusion criteria relating to the genre, tone, and other attributes of the movie titles. For example, the inclusion criteria could require the genre to be "thriller," "crime," or "mystery" and the tone to be "disturbing," "dark," or "disorienting," and the exclusion criteria could require the genre to not be "documentary," among other things. In some embodiments, a rule 206 that includes inclusion and exclusion criteria can be specified by a content distributor via, e, a user interface provided by the content item group generator 130. Given such a rule 206, the content item group generator 130 queries the metadata tags 204 associated with the content items 202 to identify particular content items 202 that satisfy the rule 206. Returning to the "psychological thriller" title group example, the content item group generator 130 could query metadata tags associated with different movie titles to identify movie titles that are associated with "thriller," "crime," or "mystery" tags and "disturbing," "dark," or "disorienting" tags, but not a "documentary" tag. The identified movie titles could then be assigned to the "psychological thriller" title group. Experience has shown that the rules 206 can be used to generate content item groups that are more unique and include less noise relative to the conventional approach of assigning generic categories (e.g., "comedy," "romance," or "science fiction" genres for movie titles) to content items. For example, the rules 206 can reduce noise caused by metadata tags (e.g., the metadata tags 204 or 205) being misassigned to content items 202.

As shown, the list generator 132 takes as inputs (1) the content item groups 208 that are generated by the content item group generator 130, and (2) user information 214 associated with a user. In some embodiments, the user information 214 indicates particular content item(s) 202 that a user has purchased and/or otherwise engaged with as well as time(s) associated with those user purchases and/or engagements. The user can engage with the particular content item(s) 202 in any technically feasible manner, such as by viewing, clicking on, saving, liking, etc. the particular content item(s) 202. Given such inputs, the list generator 132 outputs a set of content item lists 216 and a set of suggested content item lists 218 for display to the user. In some embodiments, the user information 214 indicates only particular content item(s) 202 that a user has purchased.

The list generator 132 generates, for each of the content items 202, a corresponding representation of that content item 202 in terms of associations of the content item 202 with various content item groups 208. Illustratively, the representation of each content item 202 can be a content item vector 210. Although described herein primarily with respect to content item vectors as a reference example, in other embodiments, any technically feasible representations (e.g., arrays or strings) of content items can be used. As shown, each content item vector 210 is a multi-column vector in which each column includes a weight value indicating an association between the content item 202 and a particular content item group 208. Any technically feasible technique relating to machine learning can be applied to generate the content item vector 210. For example, in some embodiments, a text analysis technique, such as term-frequency-inverse document frequency (TF-IDF), can be applied to process assignments of the content items 202 to the content item groups 208 and generate the content item vectors 210. TF-IDF is a technique for computing a weight for each word that signifies the importance of the word in a document and a corpus of documents. Using TF-IDF, text strings that include the names of content item groups 208 to which each content item 202 has been assigned can be processed to compute weight values (also sometimes referred to as "scores") relating those content items 202 to each of the content item groups 208. In such cases, TF-IDF automatically emphasizes unique content item groups 208 that fewer content items 202 belong to, and vice versa. Once computed, the weights indicating associations between each content item 202 and the content item groups 208 can be used to construct a content item vector 210 for the content item 202 that includes columns of weights corresponding to the content item groups 208.

Using the content item vectors 210 and the user information 214, the list generator 132 can generate a representation of a user in terms of associations of the user with the content item groups 208. Illustratively, the representation of the user can be a user vector 212. Although described herein primarily with respect to user vectors as a reference example, in other embodiments, any technically feasible representations (e.g., arrays or strings) of users can be used. Similar to the content item vectors 210, the user vector 212 is a multi-column vector in which each column includes a weight value indicating an association, and in particular an affinity, of the user for a content item group 208 corresponding to the column. Returning to the movie titles example, a user vector 212 could include a column whose weight indicates the affinity of a user for the "psychological thriller" title group, as well other columns whose weights indicate the affinity of the user for other movie title groups. In some embodiments, the list generator 132 generates the user vector 212 for a user by computing a weighted sum of content item vectors 210 associated with content items 202 that the user has purchased and/or otherwise engaged with, as indicated by the user information 214. In some embodiments, the weight that each content item vector 210 is multiplied by in the weighted sum can decay exponentially based on the time when the user purchased and/or otherwise engaged with the associated content item 202, thereby providing a recency bias that emphasizes content items 202 the user purchased and/or engaged with more recently. In some embodiments, the list generator 132 does not compute a time decay when the number of content items that the user has purchased and/or otherwise engaged with is less than a threshold number, in order to prevent weights in the user vector 212 from being too small in value.

FIG. 3 illustrates generating an exemplar user vector 318, according to various embodiments. A shown, to generate the user vector 318, the list generator 132 computes a weighted sum of content item vectors 302, 304, 306, 308, 310, 312, 314, and 316 (collectively referred to herein as "content item vectors 302-316"), each of which is associated with a different content item 202 that a user has purchased and/or otherwise engaged with. In some embodiments, the content item vectors 302-316 can be generated using TF-IDF, described above in conjunction with FIG. 2. Illustratively, a content item 202 associated with the content item vector 302 was purchased and/or engaged with 0 months ago, a content item 202 associated with the content item vector 304 was purchased and/or engaged with 0 months ago, a content item 202 associated with the content item vector 306 was purchased and/or engaged with 2 months ago, a content item 202 associated with the content item vector 308 was purchased and/or engaged with 5 months ago, a content item 202 associated with the content item vector 310 was purchased and/or engaged with 8 months ago, a content item 202 associated with the content item vector 312 was purchased and/or engaged with 8 months ago, a content item 202 associated with the content item vector 312 was purchased and/or engaged with 9 months ago, and a content item 202 associated with the content item vector 316 was purchased and/or engaged with 11 months ago, as indicated by the column "Months Behind." In other embodiments, different units of time may be used (e.g., days, weeks, years, etc.). The list generator 132 applies exponential decay based on when the content item 202 associated with each of the content items vectors 302-316 was purchased and/or otherwise engaged with to determine exemplary weights of 1, 1, 0.75, 0.5, 0.3, 0.3, 0.27, and 0.27 for the content items vectors 302, 304, 306, 308, 310, 312, 314, and 316, respectively. In other words, the more time that has elapsed since the user purchased and/or otherwise engaged with the content item, the lower the weight assigned to the corresponding content item vector. Using such weights, the list generator 132 computes a weighted sum of the content item vectors 302-316 to generate the user vector 318.

Illustratively, the columns of the content item vectors 302-316, and the user vector 318 that is a weighted sum of the content item vectors 302-316, can be grouped into categories $320_{1-N}$ (collectively referred to herein as categories 320 and individually referred to herein as a category 320). Any suitable categories of content item groups can be used. In some embodiments, each of the categories of content item groups is a category that can be selected for display via a user interface, as discussed in greater below in conjunction with FIGS. 4-5. Returning to the movie titles example, each of the content item vectors 302-316 could be associated with a different movie title, and the categories 320 could be categories of movie title groups. For example, the categories of movie title groups could include a "genre" category that includes movie title groups relating to various movie genres and sub-genres, such as a "psychological thriller" title group, a "romantic comedy" title group, a "buddy cop" title group, etc. As another example, the categories of movie title groups could include a "franchise" category that includes movie title groups relating to various movie franchises. As yet another example, the categories of movie title groups could include a "themes" category that includes movie title groups relating to various types of storylines/archetypes within movies, such as "becoming a hero" and the like. As a further example, the categories of movie title groups could include a "personas" categories that includes movie title groups associated with various actors, characters, directors, composers, etc. In such cases, the user vector 318 that is a weighted sum of the content item vectors 302-316 could indicate affinities of the user for various movie title groups that are within the categories 320. In some embodiments, a higher weight in the user vector 318 indicates a higher user affinity for an associated content item groups 208, and vice versa.

As discussed in greater detail below, the list generator 132 generates one or more content item lists including content items 202 that a user has purchased and/or otherwise engaged with and that are within content item groups (e.g., movie title groups) associated with sufficiently high affinities, or the highest affinities, in each category 320. In some embodiments, the list generator 132 identifies the content item groups that are associated with sufficiently high affinities by selecting content item groups whose weights in the user vector 318 are greater than a threshold value. Doing so essentially extracts peaks of a vector space of the user vector 318, which indicate content item groups that are important to the user, i.e., that the user has a sufficiently high affinity with. It should be noted that if the user has purchased and/or otherwise engaged with a larger number of content items 202, then the weight values in the user vector 318 will be higher and a larger number of content item groups will be selected based on the threshold, and vice versa. As a result, the number of content item lists that are associated with the content item groups and presented to the user will dynamically increase as the user purchases and/or otherwise engages with more content items 202 that can be included in those lists. In some embodiments, the list generator 132 only selects content item groups whose weights in the user vector 318 are greater than the threshold value for particular categories of content groups and/or when the number of content items that a user has purchased and/or otherwise engaged with is greater than a predefined number. For example, when the number of content items the user has purchased and/or otherwise engaged with is not greater than the predefined number, then the list generator can instead select up to a predefined number of content item groups within a category of content item groups that are associated with the highest weights in the user vector. Selecting up to the predefined number of content item groups helps to ensure that some content item groups are selected in cases where weights in the user vector are relatively low in value (and, therefore, would not meet the threshold described above) because the user has not purchased and/or otherwise engaged with a large enough number of content items.

Returning to FIG. 2, after computing the user vector 212 based on the content item vectors 210 associated with content items 202 that a user has purchased and/or otherwise engaged with, the list generator 132 generates content item lists 216 and suggested content item lists 218 based on the user vector 212. As described, in some embodiments, the list generator 132 can generate the content item lists 216 to include content items that the user has purchased and/or otherwise engaged with in content item groups that the user has a sufficiently high affinity with, or the highest affinity with, as indicated by associated weights in the user vector 212. Other content items 202 that the user has purchased and/or otherwise engaged with, but are in content item groups that the user does not have a sufficiently high affinity with, or the highest affinity with, can be included in suggested content item lists 218.

In some embodiments, the list generator 132 further deduplicates the content item lists 216 and/or the suggested content item lists 218 so that the same content items do not appear repeatedly in different lists 216 and/or 218. In some embodiments, depending on the category that particular content item groups belong to and/or the total number of content items that a user has purchased and/or otherwise engaged with, either a strict overlapping rule that requires the content items in a content item list (or suggested content item list) to not appear in any previous content item lists (or suggested content item lists), or a dynamic overlapping rule that requires the content items in a content item list (or suggested content item list) to not appear in previous content item lists (or suggested content item lists) more than a dynamic threshold number of times, can be applied to deduplicate the content item lists 216 and/or the suggested content item lists 218, as discussed in greater detail below in conjunction with FIGS. 7-8. For example, in some embodiments, the dynamic threshold can be computed based on a smallest size of one or more previous content item lists in a category of content item lists 216 or suggested content item lists 218. Returning to the movie titles example, the strict overlapping rule could be applied to certain categories of movie title groups, such as movie title groups relating to movie franchises and personas (e.g., actors, characters, directors, composers, etc.). The dynamic overlapping rule could be applied to other categories of movie title groups, such as movie title groups relating to genres when the total number of movie titles that the user has purchased and/or otherwise engaged with is greater than a predefined number.

Once generated, the content item lists 216 and the suggested content item lists 218 can be presented to the user in any technically feasible manner. For example, the content item lists 216 and the suggested content item lists 218 could be transmitted to a computing device for display to a user, as part of one or more webpages and/or other user interface (s). In some embodiments, the user can also modify the content item lists 216 and/or the suggested content item lists 218 to add and/or remove content items 202 from those lists, as desired.

Figure 4:
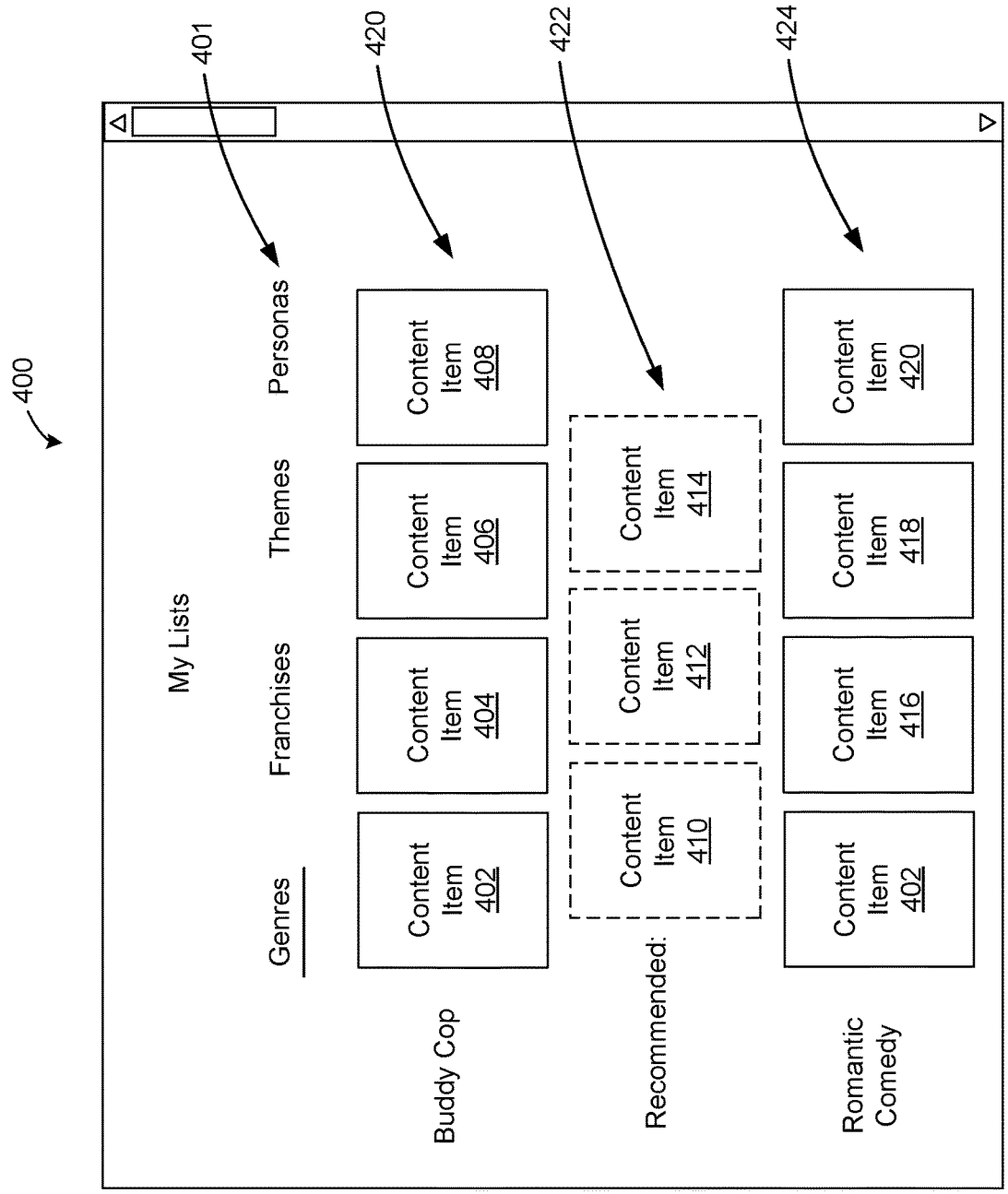
FIG. 4 illustrates an exemplar user interface for displaying lists of content items, according to various embodiments.

FIG. 4 illustrates an exemplar user interface 400 for displaying lists of content items, according to various embodiments. As shown, the user interface 400 permits a user to select different categories 401 of lists of content items, namely the "Genres," "Franchises," "Themes," and "Personas" categories. In some embodiments, the categories 401 of content item lists correspond to categories of content item groups that are associated with those content item lists, as described above in conjunction with FIGS. 2-3.

Illustratively, the user interface 400 includes a "Buddy Cop" content item list 420, a recommended content item list 422 that includes recommended "Buddy Cop" content items, and a "Romantic Comedy" content item list 424 that are associated with the "Genre" category. Each of the "Buddy Cop" list 420 and the "Romantic Comedy" content item lists 424 includes content items within an associated content item group that the user has purchased and/or otherwise engaged with. Content items within the content item lists 420 and 424 can be ordered in any technically feasible manner. Returning to the movie titles example, in some embodiments, movies titles in a list of movie titles can be ordered by release date or alphabetically by title. The content item lists 420 and 424 can be generated according to techniques described above in conjunction with FIGS. 2-3. Notably, the generated content item lists (e.g., the content item lists 420 and 424) are personalized to a user and emphasize unique groupings of content items, as opposed to the lists of generic categories such as "comedy," "romance," "science fiction," etc. that are typically generated using conventional techniques.

As shown, the recommended content item list 422 includes recommended content items 410, 412, and 414 within the "Buddy Cop" content item group that the user has not previously purchased and/or otherwise engaged with. Recommended content item lists (e.g., recommended content item list 422) are optional lists that can be presented to a user in some embodiments. In other embodiments, such as when only content items that a user has purchased are being curated, recommended content item lists may not be generated or presented to the user. In some embodiments, recommend content items to include recommended content item lists can be determined by comparing the user vector 212 to the content item vectors 210 associated with content items (e.g., in a particular content item group) that a user has not yet purchased and/or otherwise engaged with. In such cases, the recommended content items that are presented and/or the order in which recommended content items are presented can be based on similarities between the user vector 212 and the content item vectors 210 associated with the recommended content items.

In some embodiments, content item lists (e.g., content item lists 420 and 424) that are presented to a user can be ordered according to affinities of the user with content item groups associated with those content item lists, as indicated by the user vector described above in conjunction with FIGS. 2-3. For example, the user vector could indicate that, within the "Genre" category of content item lists, a content item group for "Buddy Cop" content items is associated with a highest weight, and therefore a highest user affinity, a content item group for "Romantic Comedy" content items is associated with a next highest weight and user affinity, etc. In such a case, the "Buddy Cop" content item list 420 can be presented first, the "Romantic Comedy" list 424 can be presented second, etc.

Illustratively, deduplication has been performed so that the content items 402, 404, 406, and 408 that appear in the "Buddy Cop" content item list 420 do not generally reappear in other content item lists such as the "Romantic Comedy" content item list 424 that includes content items 402, 416, 418, and 420, except the content item 402 reappears in the "Romantic Comedy" content item list 424. For example, a dynamic overlapping rule, discussed in greater detail below in conjunction with FIG. 7, could be applied that permits the content item 402 to reappear in the "Romantic Comedy" content item list 424 because the content item 402 did not appear in previous content item lists more than a threshold number of times. Alternatively, a strict overlapping rule, discussed in greater detail below in conjunction with FIG. 8, could be applied, in which case no content items that appear in any content item list (e.g., the list 420 or 424) can reappear in a subsequent content item list.

Figure 5:
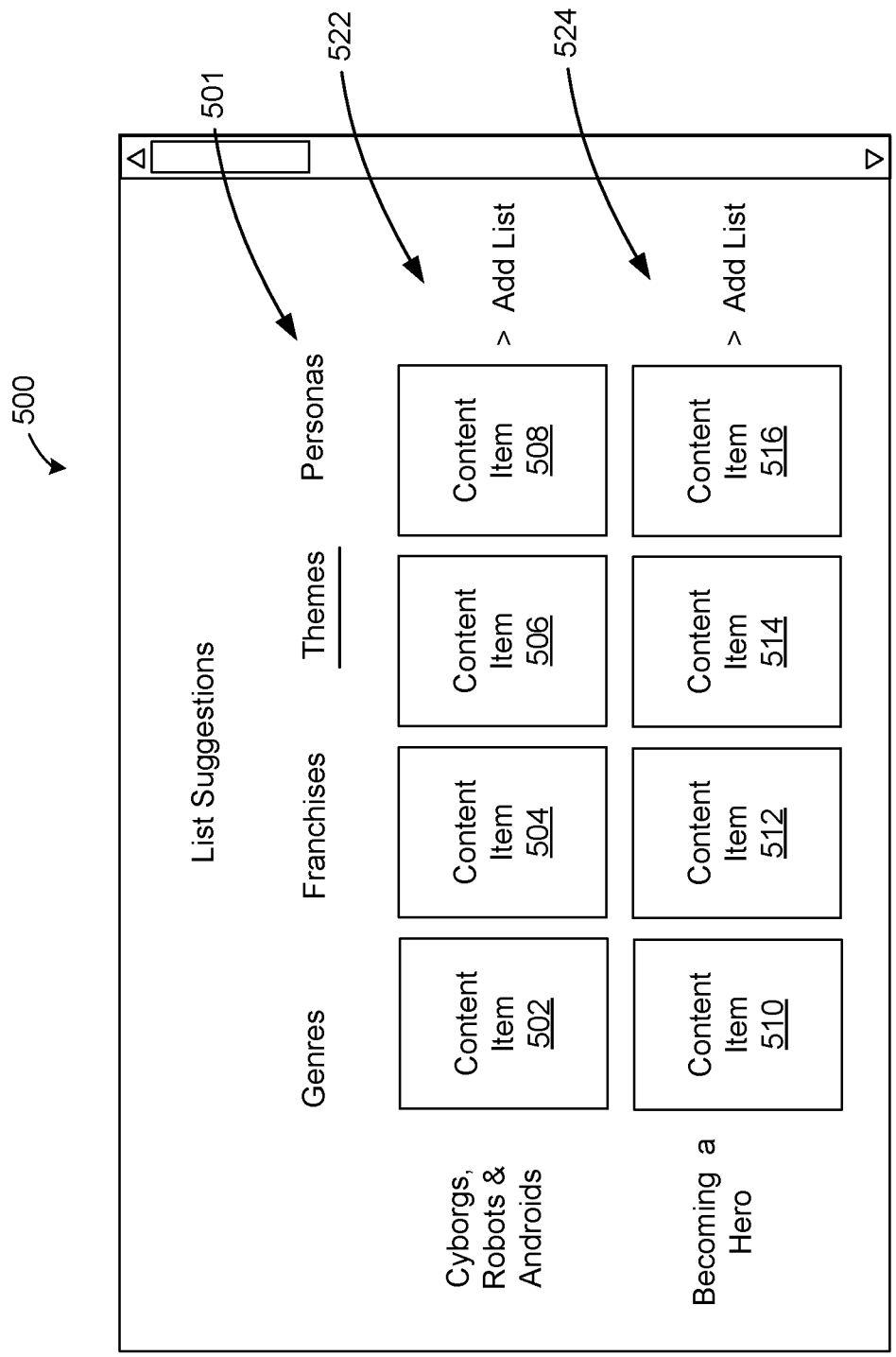
FIG. 5 illustrates an exemplar user interface for displaying suggested lists of content items, according to various embodiments.

FIG. 5 illustrates an exemplar user interface 500 for displaying suggested content item lists, according to various embodiments. For example, the user interface 400 of FIG. 4 and the user interface 500 could be different web pages of a website, different user interfaces of a mobile device application, or the like. Whereas the user interface 400 includes content item lists (e.g., content item lists 420 and 424) that are associated with content item groups that a user has a sufficiently high affinity with, or the highest affinity with (and recommended content item lists), the user interface 500 includes suggested content item lists (e.g., suggested content item lists 522 and 524) that are associated with content item groups that the user does not have a sufficiently high affinity with, or does not have the highest affinity with. The user interface 500 permits a user to peruse suggested content item lists that may also be of interest to the user, and to add suggested content item lists to the set of content item lists that are presented via the user interface 400.

As shown, the user interface 500 permits a user to select different categories 501 of suggested content item lists, namely the "Genres," "Franchises," "Themes," and "Personas" categories. Similar to the discussion above in conjunction with FIG. 4, the categories 501 of suggested content item lists correspond to categories of content item groups that are associated with those suggested content item lists. Illustratively, the user interface 500 includes a "Cyborgs, Robots & Androids" suggested content item list 522 that includes content items 502, 504, 506 and 508, and a "Becoming a Hero" suggested content item list 524 that includes content items 510, 512, 514, and 516, both of which are associated with the "Themes" category. Each of the "Cyborgs, Robots & Androids" suggested content item list 522 and the "Becoming a Hero" suggested content item list 524 includes content items within an associated content item group that the user has purchased and/or otherwise engaged with. Content items within the suggested content item lists 522 and 524 can be ordered in any technically feasible manner, such as by release date or alphabetically by title. In some embodiments, the suggested content item lists 522 and 524 can be generated according to techniques described above in conjunction with FIGS. 2-3.

Similar to the discussion above in conjunction with FIG. 4, suggested content item lists (e.g., suggested content item lists 522 and 524) can be ordered according to affinities of the user with content item groups associated with those suggested content item lists, as indicated by the user vector 212. For example, the user vector 212 could indicate that, within the "Themes" category of suggested content item lists, a content item group for "Cyborgs, Robots & Androids" content items is associated with a highest weight, and therefore a highest user affinity, a content item group for "Becoming a Hero" content items is associated with a next highest weight and user affinity, etc. In such a case, the "Cyborgs, Robots & Androids" suggested content item list 522 can be presented first, the "Becoming a Hero" suggested content item list 524 can be presented second, etc.

Figure 6:
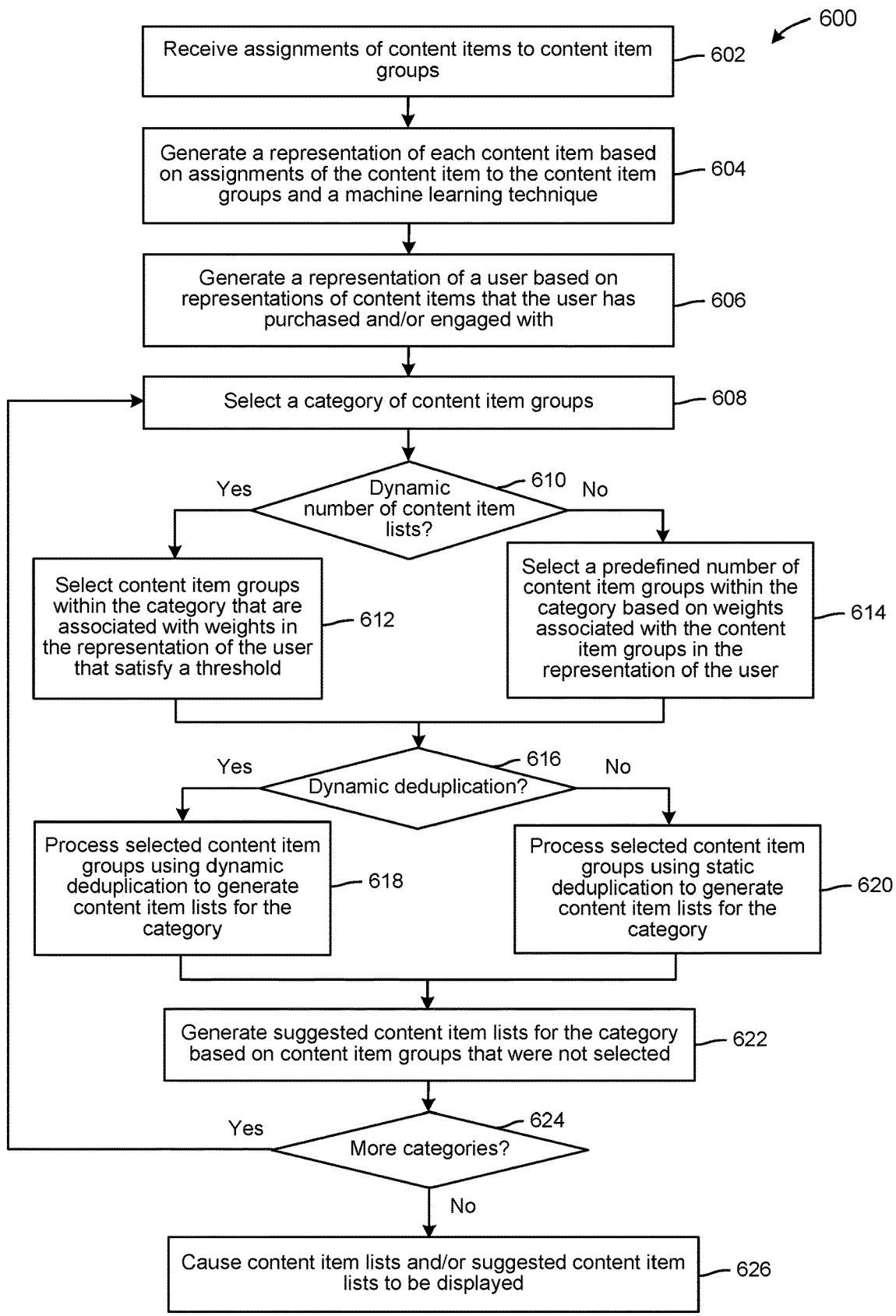
FIG. 6 sets forth a flow diagram of method steps for generating and displaying lists of content items, according to various embodiments.

FIG. 6 sets forth a flow diagram of method steps for generating and displaying lists of content items, according to various embodiments. Although the method steps are described in conjunction with the system of FIG. 1, persons of ordinary skill in the art will understand that any system configured to perform the method steps, in any order, is within the scope of the present disclosure.

As shown, a method 600 begins at step 602, where the list generator 132 receives assignments of content items (e.g., the content items 202) to content item groups (e.g., the content item groups 208). In some embodiments, the content item group generator 130 applies rules defining various inclusion and exclusion criteria to content items and associated metadata in order to assign content items to content item groups, as described above in conjunction with FIG. 2.

At step 604, the list generator 132 generates a representation of each content item (e.g., a content item vector 210) based on assignments of the content item to the content item groups and a machine learning technique. As described, in some embodiments, a text analysis technique, such as TF-IDF, can be applied to determine weights associating each content item to various content item group, and the weights can be combined into a vector of weights for each content item.

At step 606, the list generator 132 generates a representation of a user (e.g., user vector 212) based on representations of content items associated with content items that the user has purchased and/or otherwise engaged with. As described, in some embodiments, the list generator 132 computes a weighted sum of content item vectors associated with content items the user has purchased and/or otherwise engaged with, and the weight for each content item vector decays exponentially based on the time that an associated content item was purchased and/or otherwise engaged with by the user (by, e.g., viewing, clicking on, saving, liking, etc. the content item). In some embodiments, the list generator 132 does not compute a time decay when the number of content items that the user has purchased and/or otherwise engaged with is less than a threshold number.

At step 608, the list generator 132 selects a category (e.g., one of the categories 320) of content item groups. At step 610, if the selected category is associated with a dynamic number of content item lists, then at step 612, the list generator 132 selects content item groups within the category that are associated with weights in the representation of the user that satisfy a threshold for the weights. As described, if the user has purchased and/or otherwise engaged with more content items, then the weight values in the representation of the user (e.g., user vector 212) will be larger and a larger number of content item groups will be selected based on the threshold, and vice versa. As a result, the number of content item lists that are associated with the content item groups and presented to the user will dynamically increase as the user purchases and/or otherwise engages with more content items that can be included in those content item lists. In some embodiments, whether the selected category is associated with a dynamic number of content item lists depends on the total number of content items that the user has purchased and/or otherwise engaged with. For example, a dynamic number of content item lists could be used if the total number of content items that the user has purchased and/or otherwise engaged with is greater than a predefined number. Returning to the movie titles example, a "genre" category could be associated with a dynamic number of content item lists if the total number of movie titles the user has purchased and/or otherwise engaged with is greater than a predefined number.

On the other hand, if the selected category is not associated with a dynamic number of content item lists, then the method 600 continues to step 614, where the list generator 132 selects a predefined number of content item groups within the category based on weights associated with the content item groups in the representation of the user. Returning to the movie titles example, a "franchise" title group could be associated with a predefined number of 30 content item groups. In such a case, the list generator 132 can select up to 30 franchises that are associated with the highest weights in the representation of the user (e.g., user vector 212). In some embodiments, the threshold at step 612 and the predefined number at step 614 can vary depending on the category of content item groups.

At step 616, if dynamic deduplication is to be performed for the selected category, then at step 618, the list generator 132 processes the selected content item groups using dynamic deduplication to generate content item lists (e.g., the content item lists 216) for the category. In some embodiments, dynamic deduplication is only performed when the total number of content items that the user has purchased and/or otherwise engaged with is less than a predefined number, in order to present lists having more content items when the user has only purchased and/or otherwise engaged with a small number of content items. Method steps for performing dynamic deduplication, according to some embodiments, are discussed in greater detail below in conjunction with FIG. 7.

On the other hand, if dynamic deduplication is not to be performed for the selected category, then the method 600 continues to step 620, where the list generator 132 processes the selected content item groups using static deduplication to generate content item lists (e.g., the content item lists 216) for the category. Method steps for performing static deduplication, according to some embodiments, are discussed in greater detail below in conjunction with FIG. 8.

In some embodiments, the list generator 132 can perform additional and/or different deduplication techniques than the dynamic and static deduplication, described above. Returning to the movie titles example, movie titles that appear in lists of movie titles associated with particular franchises can be filtered out from other lists of movie titles, such as lists that are associated with various genres, because those movie titles can be found relatively easily in the lists associated with franchises.

At step 622, the list generator 132 generates suggested content item lists (e.g., the suggested content item lists 218) for the category based on content item groups that were not selected at step 614. In some embodiments, the suggested content item lists can be presented separately (e.g., in a different webpage or other user interface) from the other content item lists, as described above in conjunction with FIGS. 4-5. In some embodiments, the list generator 132 can also apply static and/or dynamic deduplication to the suggested content item lists.

At step 624, if there are more categories to process, then the method 600 returns to step 608, where the list generator 132 selects another category of content item groups. On the other hand, if there are no more categories to process, then the method 600 continues to step 626, where the list generator 132 causes the content item lists and/or the suggested content item lists to be displayed. As described, the content item lists and/or the suggested content item lists can be presented to a user in any technically feasible manner, such as part of one or more webpages and/or other user interface(s) that are transmit to a computing device for display to the user. In some embodiments, the user is also permitted to modify the content item lists and/or the suggested content item lists to add and/or remove content items from those lists.

Figure 7:
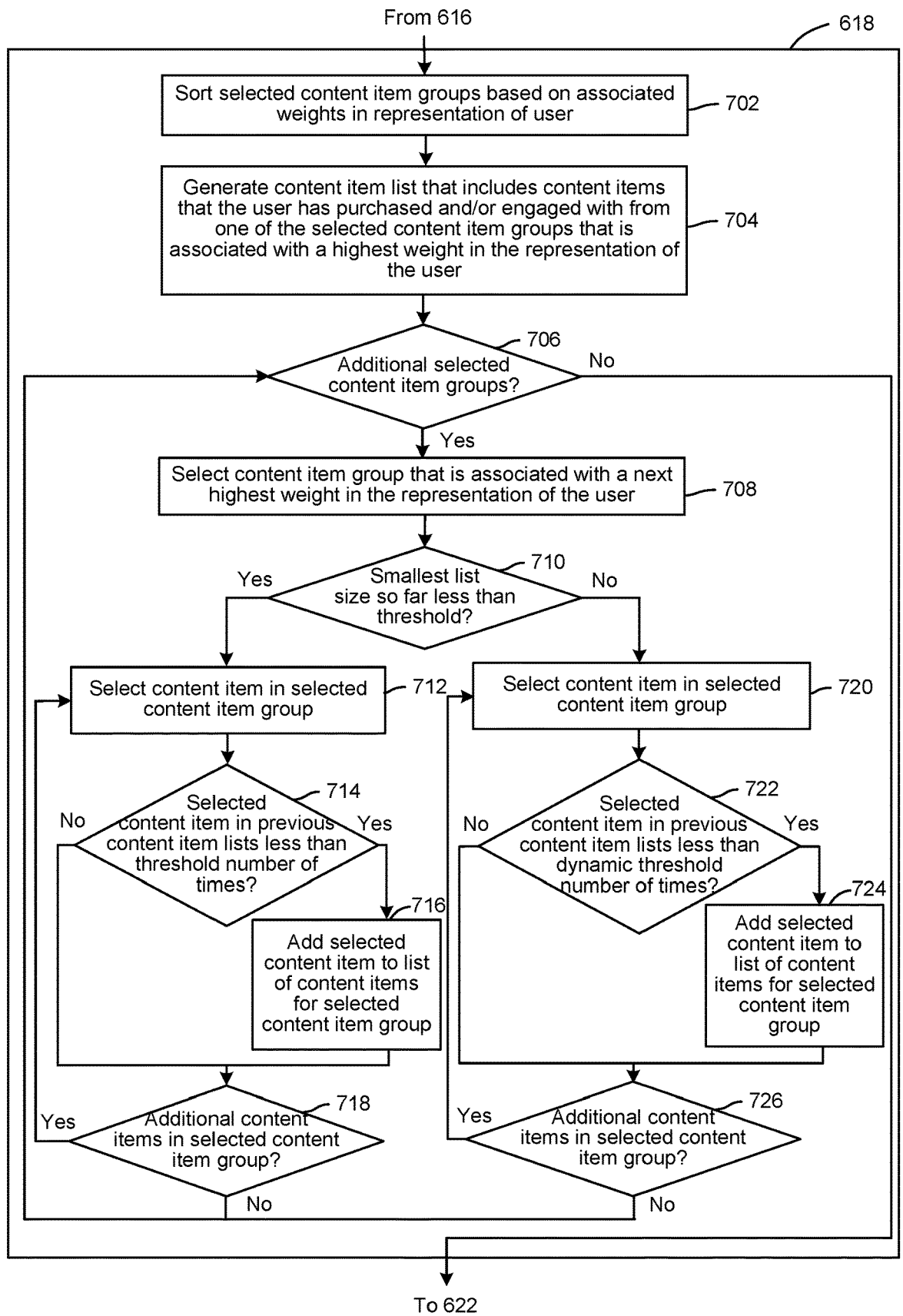
FIG. 7 sets forth a flow diagram of method steps for performing dynamic deduplication on content item lists, according to various embodiments.

FIG. 7 sets forth a flow diagram of method steps for performing dynamic deduplication on content item lists at step 618 of FIG. 6, according to various embodiments. Although the method steps are described in conjunction with the system of FIG. 1, persons of ordinary skill in the art will understand that any system configured to perform the method steps, in any order, is within the scope of the present disclosure.

As shown, at step 702, the list generator 132 sorts the selected content item groups based on associated weights in the representation of the user (e.g., user vector 212)e. As described, the associated weights in the representation of the user indicate affinities of a user for different content item groups. In some embodiments, the selected content item groups are sorted in descending order based on the associated weights so that lists for content item groups that a user has greater affinity with can be displayed earlier, and vice versa.

At step 704, the list generator 132 generates a content item list that includes content items that the user purchased and/or otherwise engaged with from one of the selected content item groups that is associated with a highest weight in the representation of the user. Content items within the content item list can be ordered in any technically feasible manner. As described, in the example of movie titles, movies titles in a list of movie titles can be ordered by release date or alphabetically by title in some embodiments.

At step 706, if additional content groups were selected, then at step 708, the list generator 132 selects a content item group that is associated with a next highest weight in the representation of the user. At step 710, if the smallest list that has been generated so far is less than a threshold size, then at step 712, the list generator 132 selects a content item in the selected content item group. For example, the threshold size can be 10 content items in some embodiments.

At step 714, if the selected content item appears in previous content item lists (according to the sorted ordering determined at step 702) less than a predefined threshold number of times, then at step 716, the list generator 132 adds the selected content item to a content item list for the selected content item group. Similar to step 704, content items within the content item list at step 716 can be ordered in any technically feasible manner, such as by release date or alphabetically by title. In some embodiments, the predefined threshold number can be 2.

If the selected content item does not appear in previous content item lists less than the predefined threshold number of times, or after the list generator 132 adds the selected content item to a list of content items at step 716, then at step 718, the list generator 132 determines if there are additional content items in the selected content item group. If there are additional content items in the selected content item group, then returning to step 712, the list generator 132 selects another content item in the selected content item group.

On the other hand, if the list generator 132 determines, at step 710, that the size of the smallest list that has been generated so far is not less than the threshold size, then continuing to step 720, the list generator 132 selects a content item in the selected content item group. Step 720 is similar to similar to step 714, described above.

At step 722, if the selected content item appears in previous content item lists less than a dynamic threshold number of times, then at step 724, the list generator 132 adds the selected content item to a list of content items for the selected content item group. As described, in some embodiments, the dynamic threshold can be computed based on a smallest size of the previous content item lists. For example, the dynamic threshold could be a multiple of the smallest size of the previous content item lists. Similar to step 704, content items within the content item list at step 724 can be ordered in any technically feasible manner, such as by release date or alphabetically by title.

At step 726, if there are additional content items in the selected content item group, then returning to step 712, the list generator 132 selects another content item in the selected content item group. On the other hand, if there are no additional content items in the selected content item group, then returning to step 706, the list generator 132 determines whether there are additional selected content item groups to process.

If, at step 706, the list generator 132 determines that no additional content groups were selected, then continuing to step 622, the list generator 132 generates suggested content item lists for the category based on content item groups that were not selected.

Figure 8:
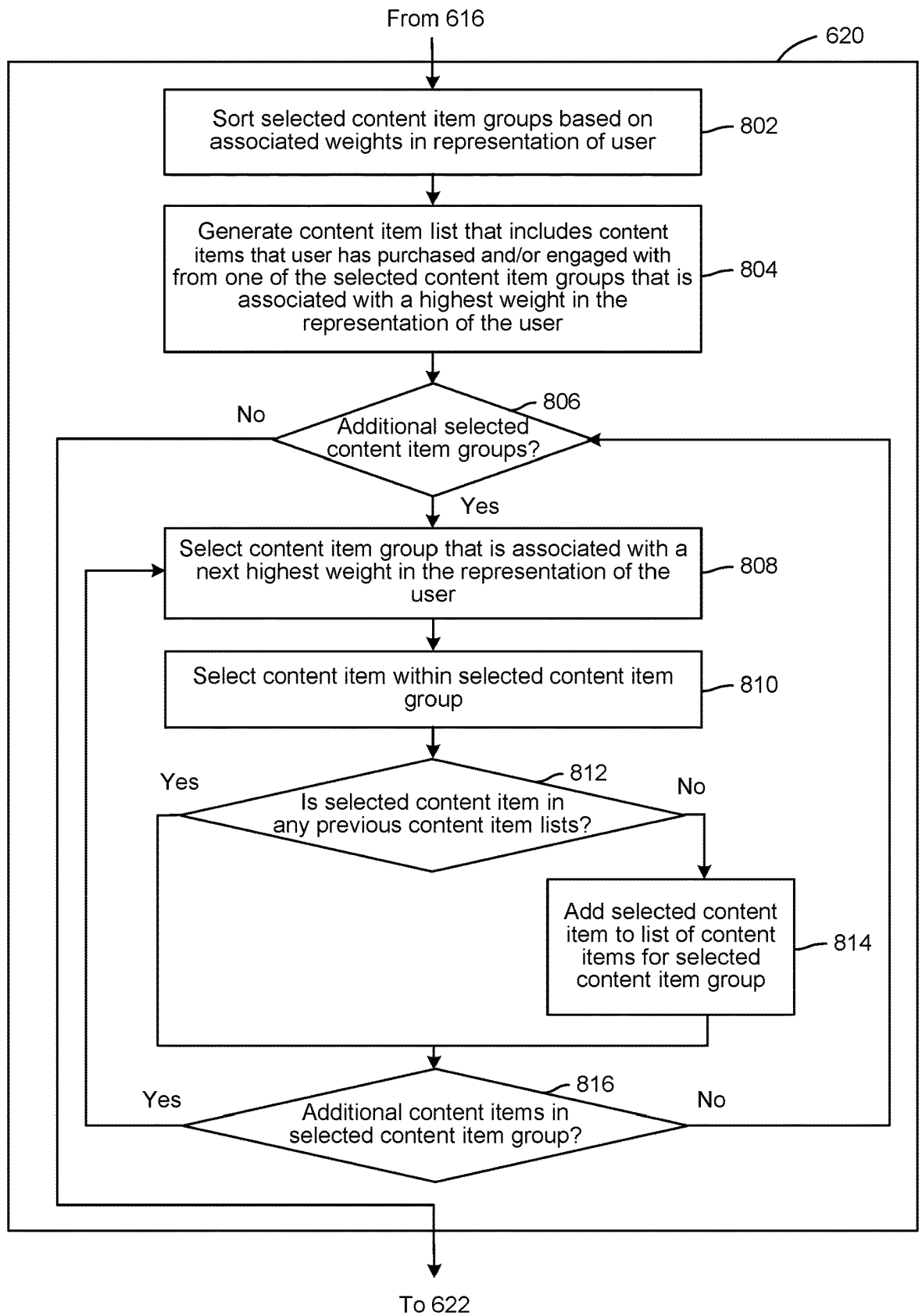
FIG. 8 sets forth a flow diagram of method steps for performing static deduplication on content item lists, according to various embodiments.

FIG. 8 sets forth a flow diagram of method steps for performing static deduplication on content item lists at step 620 of FIG. 6, according to various embodiments. Although the method steps are described in conjunction with the system of FIG. 1, persons of ordinary skill in the art will understand that any system configured to perform the method steps, in any order, is within the scope of the present disclosure.

As shown, at step 802, the list generator 132 sorts the selected content item groups based on associated weights in the representation of the user. Step 802 is similar to step 702, described above in conjunction with FIG. 7.

At step 804, the list generator 132 generates a content item list that includes content items that the user purchased and/or otherwise engaged with from one of the selected content item groups that is associated with a highest weight in the representation of the user. Step 804 is similar to step 704, described above in conjunction with FIG. 7.

At step 806, if additional content item groups were selected, then at step 808, the list generator 132 selects a content item group that is associated with a next highest weight in the representation of the user. Then, at step 810, the list generator 132 selects a content item in the selected content item group.

At step 812, if the selected content item does not appear in any previous content item lists (according to the sorted ordering determined at step 802), then at step 814, the list generator 132 adds the selected content item to a list of content items for the selected content item group. Step 812 is similar to step 714, described above in conjunction with FIG. 7, except the strict overlapping rule requires that the selected content item not appear in any previous content item lists. Content items within the content item list at step 814 can be ordered in any technically feasible manner, such as by release date or alphabetically by title.

On the other hand, if the selected content item does appear in a previous content item list at step 812, or after the list generator 132 adds the selected content item to the list of content items for the selected content item group at step 814, then at step 816, the list generator 132 determines whether there are additional content items in the selected content item group. If there are additional content items in the selected content item group, then returning to step 808, the list generator 132 selects a content item group that is associated with a next highest weight.

On the other hand, if there are no additional content items in the selected content item group, then returning to step 806, the list generator 132 determines whether additional content item groups were selected. If the list generator 132 determines that no additional content item groups were selected, then continuing to step 622, the list generator 132 generates suggested content item lists for the category based on content item groups that were not selected.

In sum, techniques are disclosed for curating content items. In some embodiments, a content item group generator applies rules defining inclusion and exclusion criteria to content items and associated metadata in order to assign the content items to content item groups. Given the assignments of content items to content item groups, a list generator applies a machine learning technique to generate, for each content item, a representation of the content item (e.g., a content item vector) that includes weights associating the content item with the content item groups. The list generator further computes a weighted sum of representations of content items that a user has purchased and/or otherwise engaged with in order to generate a representation of the user (e.g., a user vector) that includes weights indicating affinities of the user with the content item groups. Then, the list generator generates, for each of a number of categories: (1) lists that include content items the user has purchased and/or otherwise engaged with that are assigned to content item groups associated with weights in the representation of the user that satisfy a threshold; and (2) and suggested lists that include content items the user has purchased and/or otherwise engaged with but are assigned to content item groups that are not associated with weights in the representation of the user that satisfy the threshold. In addition, the list generator applies strict and/or dynamic deduplication to remove duplicate content items that appear in the content item lists and/or the suggested content item lists.

At least one technical advantage of the disclosed techniques relative to the prior art is that the disclosed techniques generate lists of content items in which the same content item does not appear more than a threshold number of times within multiple lists that are presented to a user. In addition, the disclosed techniques can generate lists of content items that convey more meaningful information that is personalized to the user. These technical advantages represent one or more technological improvements over prior art approaches.

Any and all combinations of any of the claim elements recited in any of the claims and/or any elements described in this application, in any fashion, fall within the contemplated scope of the present invention and protection.

1. In some embodiments, a computer-implemented method for curating content items comprises generating, for each content item included in a plurality of content items, a representation of the content item, wherein the representation of the content item comprises a plurality of weights associating the content item with a plurality of content item groups, generating a representation of a user based on one or more of the representations of content items, wherein the representation of the user comprises a plurality of weights associating the user with the plurality of content item groups, and wherein the one or more of the representations of content items are associated with content items that the user has at least one of purchased or engaged with, generating one or more lists of content items based on the representation of the user, and causing the one or more lists of content items to be displayed to the user.

2. The computer-implemented method of clause 1, wherein generating the one or more lists of content items comprises selecting one or more content item groups based on the representation of the user and a threshold for the plurality of weights included in the representation of the user, and generating a first set of lists of content items, wherein each list included in the first set of lists comprises one or more content items from a content item group included in the one or more content item groups, and wherein the one or more content items have been at least one of purchased or engaged with by the user.

3. The computer-implemented method of clauses 1 or 2, wherein generating the one or more lists of content items further comprises generating a second set of lists of content items, wherein each list included in the second set of lists comprises one or more content items from a content item group that is not included in the one or more content item groups.

4. The computer-implemented method of any of clauses 1-3, wherein generating the one or more lists of content items further comprises generating a second set of lists of content items, wherein each list included in the second set of lists comprises one or more content items that have not been purchased or engaged with by the user.

5. The computer-implemented method of any of clauses 1-4, further comprising ordering the first set of lists based on weights associated with the one or more content item groups in the representation of the user, and for each list included in the first set of lists, removing content items included in the list that are also included in one or more previous lists in the ordering of the first set of lists.

6. The computer-implemented method of any of clauses 1-5, further comprising ordering the first set of lists based on weights associated with the one or more content item groups in the representation of the user, and for each list included in the first set of lists, removing content items included in the list that are also included at least a threshold number of times in one or more previous lists in the ordering of the first set of lists, wherein the threshold number is based on a smallest list included in the one or more previous lists.

7. The computer-implemented method of any of clauses 1-6, further comprising generating a plurality of assignments of the plurality of content items to the plurality of content item groups based on metadata associated with the plurality of content items and rules indicating inclusion and exclusion criteria for the plurality of content item groups, wherein the representations of the content items are generated based on the plurality of assignments.

8. The computer-implemented method of any of clauses 1-7, wherein generating the representations of the content items comprises applying a text analysis technique to assignments of the plurality of content items to the plurality of content item groups.

9. The computer-implemented method of any of clauses 1-8, wherein the text analysis technique is a term-frequency-inverse document frequency technique.

10. The computer-implemented method of any of clauses 1-9, wherein the plurality of content items comprise a plurality of media content titles.

11. In some embodiments, one or more non-transitory computer-readable storage media include instructions that, when executed by at least one processor, cause the at least one processor to perform steps for curating content items, the steps comprising generating, for each content item included in a plurality of content items, a representation of the content item, wherein the representation of the content item comprises a plurality of weights associating the content item with a plurality of content item groups, generating a representation of a user based on one or more of the representations of content items, wherein the representation of the user comprises a plurality of weights associating the user with the plurality of content item groups, and wherein the one or more of the representations of content items are associated with content items that the user has at least one of purchased or engaged with, generating one or more lists of content items based on the representation of the user, and causing the one or more lists of content items to be displayed to the user.

12. The one or more non-transitory computer-readable storage media of clause 11, wherein generating the one or more lists of content items comprises selecting one or more content item groups based on the representation of the user and a threshold for the plurality of weights included in the representation of the user, and generating a first set of lists of content items, wherein each list included in the first set of lists comprises one or more content items from a content item group included in the one or more content item groups, and wherein the one or more content items have been at least one of purchased or engaged with by the user.

13. The one or more non-transitory computer-readable storage media of clauses 11 or 12, wherein generating the one or more lists of content items further comprises generating a second set of lists of content items, wherein each list included in the second set of lists comprises one or more content items from a content item group that is not included in the one or more content item groups.

14. The one or more non-transitory computer-readable storage media of any of clauses 11-13, wherein generating the one or more lists of content items further comprises generating a second set of lists of content items, wherein each list included in the second set of lists comprises one or more content items that have not been purchased or engaged with by the user.

15. The one or more non-transitory computer-readable storage media of any of clauses 11-14, wherein the instructions, when executed by the at least one processor, further cause the at least one processor to perform steps comprising ordering the first set of lists based on weights associated with the one or more content item groups in the representation of the user, and for each list included in the first set of lists, removing content items included in the list that are also included at least a threshold number of times in one or more previous lists in the ordering of the first set of lists, wherein the threshold number is based on a smallest list included in the one or more previous lists.

16. The one or more non-transitory computer-readable storage media of any of clauses 11-15, wherein the one or more content item groups are associated with a category of content item groups.

17. The one or more non-transitory computer-readable storage media of any of clauses 11-16, wherein the instructions, when executed by the at least one processor, further cause the at least one processor to perform steps comprising generating a plurality of assignments of the plurality of content items to the plurality of content item groups based on metadata associated with the plurality of content items and rules indicating inclusion and exclusion criteria for the plurality of content item groups, wherein the representations of the content items are generated based on the plurality of assignments.

18. The one or more non-transitory computer-readable storage media of any of clauses 11-17, wherein causing the one or more lists of content items to be displayed comprises generating a webpage or user interface that includes the one or more lists of content items, and transmitting the webpage or user interface over a network to a computing device of the user that displays the webpage or user interface.

19. In some embodiments, a system comprises one or more memories storing instructions, and one or more processors that are coupled to the one or more memories and, when executing the instructions, are configured to generate, for each content item included in a plurality of content items, a representation of the content item, wherein the representation of the content item comprises a plurality of weights associating the content item with a plurality of content item groups, generate a representation of a user based on one or more of the representations of content items, wherein the representation of the user comprises a plurality of weights associating the user with the plurality of content item groups, and wherein the one or more of the representations of content items are associated with content items that the user has at least one of purchased or engaged with, generate one or more lists of content items based on the representation of the user, and cause the one or more lists of content items to be displayed to the user.

20. The system of clause 19, wherein generating the one or more lists of content items comprises selecting one or more content item groups based on the representation of the user and a threshold for the plurality of weights included in the representation of the user, and generating a first set of lists of content items, wherein each list included in the first set of lists comprises one or more content items from a content item group included in the one or more content item groups, and wherein the one or more content items have been at least one of purchased or engaged with by the user.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method for curating content items, the method comprising:
generating, for each content item included in a plurality of content items, a representation of the content item, wherein the representation of the content item comprises a first plurality of weights associating the content item with a plurality of content item groups;
generating a representation of a user that comprises a second plurality of weights associating the user with the plurality of content item groups, wherein each weight included in the second plurality of weights corresponds to a different content item group in the plurality of content item groups and is computed based on combining (i) one or more of the representations of content items that belong to the corresponding content item group and that are associated with one or more first content items that the user has at least one of purchased or engaged with, and (ii) one or more time decays that are computed based on when the user at least one of purchased or engaged with the one or more first content items;
generating one or more lists of content items based on the representation of the user; and
causing the one or more lists of content items to be displayed to the user.

2. The computer-implemented method of claim 1, wherein generating the one or more lists of content items comprises:
- selecting one or more content item groups based on the representation of the user and a threshold for the first plurality of weights included in the representation of the user; and
- generating a first set of lists of content items, wherein each list included in the first set of lists comprises one or more second content items from a content item group included in the one or more content item groups, and wherein the one or more second content items have been at least one of purchased or engaged with by the user.

3. The computer-implemented method of claim 2, wherein generating the one or more lists of content items further comprises generating a second set of lists of content items, wherein each list included in the second set of lists comprises one or more third content items from a content item group that is not included in the one or more content item groups.

4. The computer-implemented method of claim 2, wherein generating the one or more lists of content items further comprises generating a second set of lists of content items, wherein each list included in the second set of lists comprises one or more third content items that have not been purchased or engaged with by the user.

5. The computer-implemented method of claim 2, further comprising:
- ordering the first set of lists based on the first plurality of weights associating the content item with a plurality of content item groups; and
- for each list included in the first set of lists, removing content items included in the list that are also included in one or more previous lists in the ordering of the first set of lists.

6. The computer-implemented method of claim 2, further comprising:
- ordering the first set of lists based on the first plurality of weights associating the content item with a plurality of content item groups; and
- for each list included in the first set of lists, removing content items included in the list that are also included at least a threshold number of times in one or more previous lists in the ordering of the first set of lists, wherein the threshold number is based on a smallest list included in the one or more previous lists.

7. The computer-implemented method of claim 1, further comprising:
- generating a plurality of assignments of the plurality of content items to the plurality of content item groups based on metadata associated with the plurality of content items and rules indicating inclusion and exclusion criteria for the plurality of content item groups, wherein the representations of the content items are generated based on the plurality of assignments.

8. The computer-implemented method of claim 1, wherein generating the representations of the content items comprises applying a text analysis technique to assignments of the plurality of content items to the plurality of content item groups.

9. The computer-implemented method of claim 8, wherein the text analysis technique is a term-frequency-inverse document frequency technique.

10. The computer-implemented method of claim 1, wherein the plurality of content items comprise a plurality of media content titles.

11. One or more non-transitory computer-readable storage media including instructions that, when executed by at least one processor, cause the at least one processor to perform steps for curating content items, the steps comprising:
- generating, for each content item included in a plurality of content items, a representation of the content item, wherein the representation of the content item comprises a first plurality of weights associating the content item with a plurality of content item groups;
- generating a representation of a user that comprises a second plurality of weights associating the user with the plurality of content item groups, wherein each weight included in the second plurality of weights corresponds to a different content item group in the plurality of content item groups and is computed based on combining (i) one or more of the representations of content items that belong to the corresponding content item group and that are associated with one or more first content items that the user has at least one of purchased or engaged with, and (ii) one or more time decays that are computed based on when the user at least one of purchased or engaged with the one or more first content items;
- generating one or more lists of content items based on the representation of the user; and
- causing the one or more lists of content items to be displayed to the user.

12. The one or more non-transitory computer-readable storage media of claim 11, wherein generating the one or more lists of content items comprises:
- selecting one or more content item groups based on the representation of the user and a threshold for the first plurality of weights included in the representation of the user; and
- generating a first set of lists of content items, wherein each list included in the first set of lists comprises one or more second content items from a content item group included in the one or more content item groups, and wherein the one or more second content items have been at least one of purchased or engaged with by the user.

13. The one or more non-transitory computer-readable storage media of claim 12, wherein generating the one or more lists of content items further comprises generating a second set of lists of content items, wherein each list included in the second set of lists comprises one or more third content items from a content item group that is not included in the one or more content item groups.

14. The one or more non-transitory computer-readable storage media of claim 12, wherein generating the one or more lists of content items further comprises generating a second set of lists of content items, wherein each list included in the second set of lists comprises one or more third content items that have not been purchased or engaged with by the user.

15. The one or more non-transitory computer-readable storage media of claim 12, wherein the instructions, when executed by the at least one processor, further cause the at least one processor to perform steps comprising:
- ordering the first set of lists based on the first plurality of weights associating the content item with a plurality of content item groups; and
- for each list included in the first set of lists, removing content items included in the list that are also included in at least a threshold number of previous lists in the ordering of the first set of lists, wherein the threshold number is based on a size of a smallest list included in the one or more previous lists.

16. The one or more non-transitory computer-readable storage media of claim 15, wherein the instructions, when executed by the at least one processor, further cause the at least one processor to perform steps comprising determining the threshold number of previous lists as a multiple of the size of the smallest list.

17. The one or more non-transitory computer-readable storage media of claim 11, wherein the instructions, when executed by the at least one processor, further cause the at least one processor to perform steps comprising:
generating a plurality of assignments of the plurality of content items to the plurality of content item groups based on metadata associated with the plurality of content items and rules indicating inclusion and exclusion criteria for the plurality of content item groups,
wherein the representations of the content items are generated based on the plurality of assignments.

18. The one or more non-transitory computer-readable storage media of claim 11, wherein causing the one or more lists of content items to be displayed comprises:
generating a webpage or user interface that includes the one or more lists of content items; and
transmitting the webpage or user interface over a network to a computing device that displays the webpage or user interface.

19. A system, comprising:
one or more memories storing instructions; and
one or more processors that are coupled to the one or more memories and, when executing the instructions, are configured to:
generate, for each content item included in a plurality of content items, a representation of the content item, wherein the representation of the content item comprises a first plurality of weights associating the content item with a plurality of content item groups,
generate a representation of a user that comprises a second plurality of weights associating the user with the second plurality of content item groups, wherein each weight included in the second plurality of weights corresponds to a different content item group in the plurality of content item groups and is computed based on combining (i) one or more of the representations of content items that belong to the corresponding content item group and that are associated with one or more first content items that the user has at least one of purchased or engaged with, and (ii) one or more time decays that are computed based on when the user at least one of purchased or engaged with the one or more first content items,
generate one or more lists of content items based on the representation of the user, and
cause the one or more lists of content items to be displayed to the user.

20. The system of claim 19, wherein generating the one or more lists of content items comprises:
selecting one or more content item groups based on the representation of the user and a threshold for the first plurality of weights included in the representation of the user; and
generating a set of lists of content items, wherein each list included in the set of lists comprises one or more second content items from a content item group included in the one or more content item groups, and wherein the one or more second content items have been at least one of purchased or engaged with by the user.

* * * * *